April 1, 1930.  F. H. OWENS  1,752,753
OPTICAL PRINTER
Filed Nov. 12, 1926

INVENTOR
FREEMAN H. OWENS
BY Philip S. Hopkins
ATTORNEY

Patented Apr. 1, 1930

1,752,753

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

OPTICAL PRINTER

Application filed November 12, 1926. Serial No. 147,980.

My invention relates generally to printers of the type used for printing photographic film and has for its primary object, the provision of a means and method for simultaneously printing the images from two separate negative films on a single positive film from opposite sides of said positive film. Such an arrangement is particularly useful in the formation of so called "talking movies" or sound film, color photography and for "trick" pictures, common in the art of cinematography.

A further object is to provide means for moving all three of the films involved in this printer by the same shaft, thereby insuring a uniform and accurate speed at which the films are driven. It will be understood that the shaft for moving the films may be driven intermittently or continuously as desired. In the embodiment illustrated in the accompanying drawing, the shaft is preferably continuously driven thereby eliminating the necessity for a shutter and other mechanism incident to an intermittent drive.

Another object lies in the provision of novel exposure frames provided with adjustable slits through which the images are projected from the negative film strips to the positive strip.

The figures are illustrated in diagrammatic form with many details which are old and common in the art omitted for the purpose of clearness.

Other objects and advantages in details of construction and operation will be apparent as the description proceeds, reference now being had to the accompanying drawing, wherein like reference numerals indicate like parts.

In the drawing:—

Figure 1:
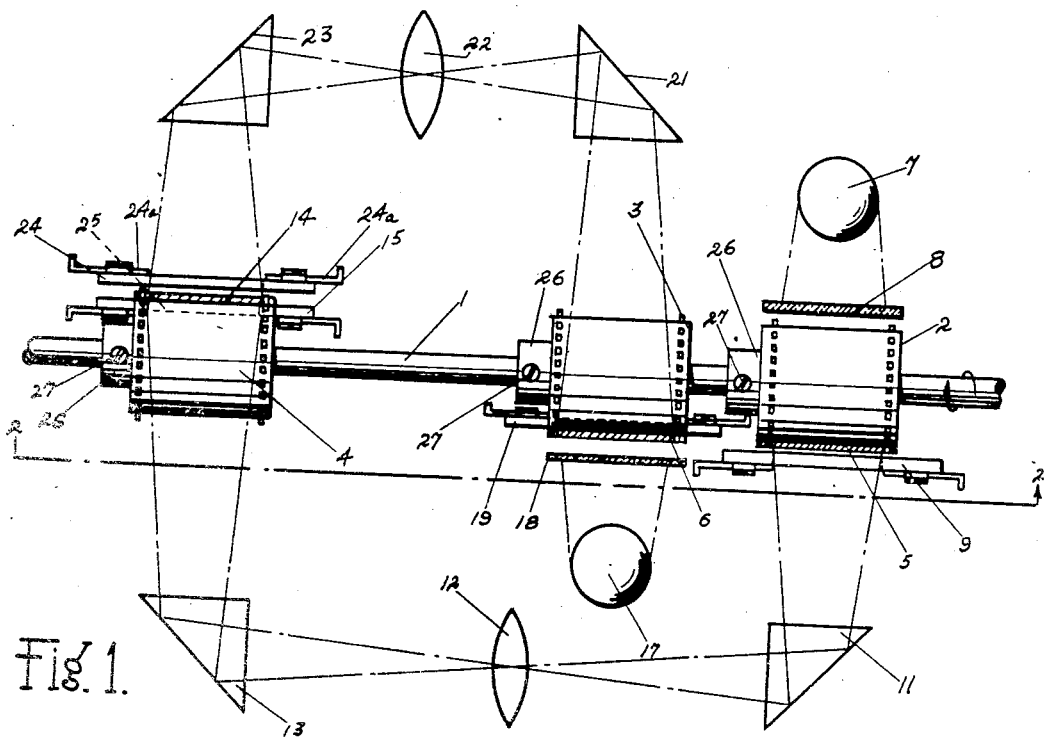
Figure 1 is a top plan diagrammatic view of my new optical printer.
Figure 2:
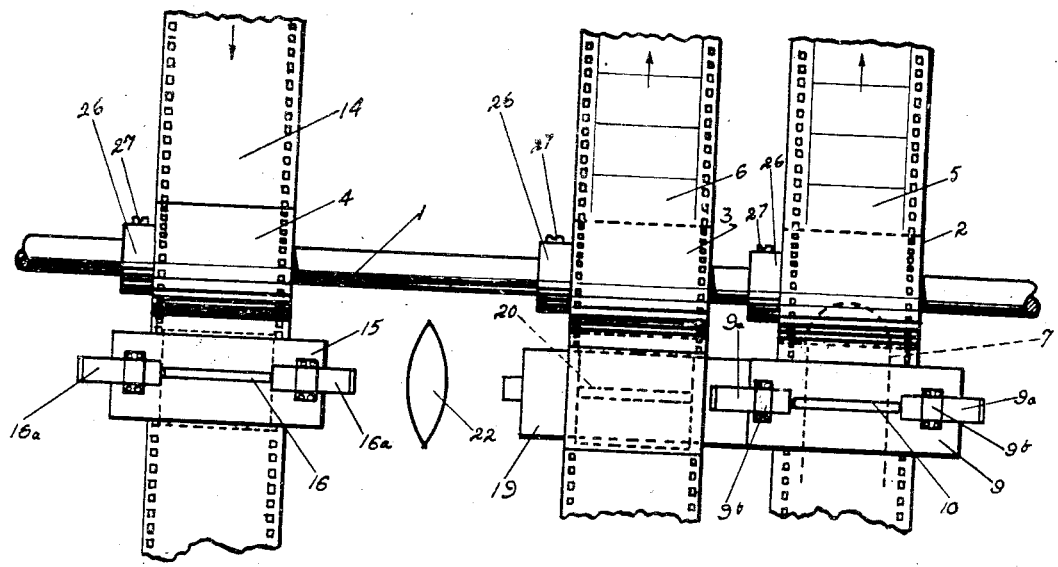
Figure 2 is a front view thereof.

A single shaft 1 is shown supporting the three sprockets, 2, 3, and 4. These sprockets are rotatable with the shaft, and the latter may be driven from any suitable source of power (not shown).

Two strips of negative film 5 and 6 are suitably threaded over the sprockets 2 and 3 respectively, and are driven thereby, the sprocket teeth engaging in the perforations in the film strips. Both of these strips of negative film are mounted on the same side of the sprockets 2 and 3, whereby they are driven in the same direction.

A suitable source of light 7 is mounted adjacent one side of the negative film strip 5 and between the light 7 and the film strip 5 is a diffusing glass 8. An exposure frame 9 provided with a slit 10 is suitably mounted directly adjacent the film strip 5, and between this exposure frame 9 and the light 7, the film 5 is moved.

Slidably mounted on the exposure frame 9, on the side opposite the film strip, are slides or masks 9ª guided by suitable straps 9ᵇ. These masks 9ª are movable over the slit 10 whereby the size thereof may be adjusted to any desired portion of the film which is to be projected. Obviously, the images on the film strip 5 which are illuminated by the lamp 7, will pass through the slit 10 where they are caught by a prism or other suitable reflecting surface 11, and projected at right angles to the film through a lens 12, where they are caught by a second prism or reflecting surface 13, and again turned at right angles and directed on to one side of the positive film strip 14, driven by the sprocket 4 and on the opposite side of the sprocket from the films 5 and 6, and thereby moving in the opposite direction. These reflected images from the film 5 pass through a second exposure frame 15 before reaching the positive film 14. This exposure frame 15 also has a narrow slit 16, through which the reflected images pass to the positive film 14, and which is provided with the slidable masks 16ª similar in all respects to the masks 9ª.

A second lamp 17 is mounted adjacent the negative film 6, but on the opposite side of the film from the light 7. A diffusing glass 18 lies between the light 17 and an exposure frame 19, provided with the slit 20 through which the illuminated images of the film 6 pass. This exposure frame is also provided with the adjustable masks 19ª movable over the slit 20. The images pass through the slit 20 to a prism or reflecting surface 21, where they are turned at right angles, through the lens 22, and caught by the second prism 23, and again turned at right angles and directed to the exposure frame 24 also provided with a slit 25 through which the illuminated and reflected images pass on to the side of film 14 opposite that which received the images from the negative film 5. In this case too, the exposure frame 24 is provided with the adjustable masks 24$^a$ movable over the slit 25 in said frame.

In the operation of my invention, the masks on the various exposure frames are adjusted to the desired position to permit the passage of such portions of the images on the negative film strips to the positive strip. Proper focusing of the lenses and adjustment of the reflecting surfaces enables the operator to bring such selected portions to the desired position on the positive strip, through the slits in the exposure frames adjacent the positive strip.

It will be obvious that upon the rotation of the shaft 1, the sprockets 2, 3 and 4 will rotate, thus driving the two negative films 5 and 6 in the same direction, and the positive film 14 in the opposite direction. The collars 26 and set screws 27, by means of which the sprockets are secured to the shaft 1, permit the adjustment of said sprockets for the purpose of correctly framing the images. The illuminated images on the negative films 5 and 6 will be reflected by their respective reflecting mediums and through the lenses to opposite sides of the positive film 14 whereon they are exposed.

Of course suitable casing, lamp housing, and other details of structure, must be provided in a complete apparatus. Such details are however, old in the art, and are omitted here for the purpose of simplifying the illustration and the description.

I do not limit myself to the exact structure herein shown and described, as obviously many changes may be made in details of construction and arrangement without departing from the spirit and scope of my invention.

I claim:—

1. An optical printer comprising a rotatable shaft, a plurality of film moving devices on said shaft for engaging strips of negative film moved by two of said devices and a single strip of positive film moved by another of said devices, and optical means associated with said film moving devices arranged for projecting the images of said negative films to said positive film from opposite sides thereof.

2. An optical printer comprising a rotatable shaft, a plurality of film moving devices on said shaft for engaging strips of negative film moved by two of said devices and a single strip of positive film moved by another of said devices, and optical means associated with said film moving devices arranged for projecting the images of said negative films to said positive film from opposite sides thereof, and exposure frames on opposite sides of said positive film, through which said images are exposed.

3. An optical printer comprising a shaft, three sprockets arranged in spaced relation on said shaft for rotation therewith and engaging separate strips of negative film moved by two of said sprockets in the same direction and a single strip of positive film, moved by said third sprocket in the opposite direction, and optical means associated with said films for projecting the images from said negative films to said positive film from opposite sides thereof.

4. An optical printer comprising a single shaft, means on said shaft for moving two negative film strips and a single positive film strip, sources of light for said negative strips, exposure frames between said negative strips and said light sources through which the images of said negative strips are projected, and optical means for projecting said images to said positive strip from opposite sides thereof.

5. An optical printer comprising a single shaft, means on said shaft for moving two negative film strips and a single positive film strip, sources of light for said negative strips, exposure frames between said negative strips and said light sources through which the images of said negative strips are projected, and optical means for projecting said images to said positive strip from opposite sides thereof, said film strips all being movable synchronously.

6. An optical printer comprising a single shaft, means on said shaft for moving two negative film strips and a single positive film strip, sources of light for said negative strips, exposure frames between said light sources and said negative strips through which the images thereon are projected, means on said frames for selectively masking said images, and optical means for projecting said masked images from said negative strips to said positive strip from opposite sides thereof.

7. An optical printer comprising a single shaft, means on said shaft for synchronously moving two negative film strips and a single positive film strip, sources of light for said negative strips, exposure frames between said light sources and said negative strips through which the images thereon are projected, means on said frames for selectively masking said images, and optical means for projecting said masked images from said negative strips to said positive strip from opposite sides thereof, and exposure frames on opposite sides of said positive film through which said projected images pass, said exposure frames being adjustable as to size.

8. An optical printer comprising a single shaft, means on said shaft for synchronously moving two negative film strips and a single positive film strip, sources of light for said negative strips, exposure frames between said light sources and said negative strips through which the images thereon are projected, means on said frames for selectively masking said images, and optical means for projecting said masked images from said negative strips to said positive strip from opposite sides thereof, and exposure frames on opposite sides of said positive film through which said projected images pass, and masking means on said latter named exposure frames for adjusting the same as to size.

FREEMAN H. OWENS.